(12) United States Patent
Vacca et al.

(10) Patent No.: US 10,759,269 B2
(45) Date of Patent: Sep. 1, 2020

(54) DEVICE FOR SEALING THE AIR INTAKE OF A MOTOR VEHICLE, CORRESPONDING FRONT-END MODULE AND MOTOR VEHICLE

(71) Applicant: Valeo Systemes Thermiques, Le Mesnil Saint Denis (FR)

(72) Inventors: Frédéric Vacca, Le Mesnil Saint Denis (FR); Enzo Mitidieri, Le Mesnil Saint-Denis (FR)

(73) Assignee: Valeo Systemes Thermiques, Le Mesnil-Saint-Denis (FR)

( * ) Notice: Subject to any disclaimer, the term of this patent is extended or adjusted under 35 U.S.C. 154(b) by 259 days.

(21) Appl. No.: 15/760,028

(22) PCT Filed: Aug. 24, 2016

(86) PCT No.: PCT/EP2016/069927
§ 371 (c)(1),
(2) Date: Jul. 5, 2018

(87) PCT Pub. No.: WO2017/045879
PCT Pub. Date: Mar. 23, 2017

(65) Prior Publication Data
US 2018/0327032 A1 Nov. 15, 2018

(30) Foreign Application Priority Data

Sep. 14, 2015 (FR) .................................... 15 58572

(51) Int. Cl.
*B60K 11/08* (2006.01)
*B62D 25/08* (2006.01)

(52) U.S. Cl.
CPC .......... *B60K 11/085* (2013.01); *B62D 25/084* (2013.01); *B62D 25/085* (2013.01); *B60Y 2306/01* (2013.01); *Y02T 10/88* (2013.01)

(58) Field of Classification Search
CPC ... B60K 11/08; B60K 11/085; B60Y 2306/01; B62D 25/08; B62D 25/084; B62D 25/085
(Continued)

(56) References Cited

U.S. PATENT DOCUMENTS

| 4,944,540 A * | 7/1990 | Mansoor | ................ B60K 11/08 |
| | | | 180/68.6 |
| 6,412,581 B2 * | 7/2002 | Enomoto | ............... B60K 11/04 |
| | | | 165/69 |

(Continued)

FOREIGN PATENT DOCUMENTS

| DE | 44 35 396 A1 | 8/1995 |
| DE | 10 2007 033413 A1 | 1/2009 |

(Continued)

OTHER PUBLICATIONS

International Search Report issued in PCT/EP2016/069927 dated Oct. 19, 2016 (3 pages).

(Continued)

*Primary Examiner* — Jason S Daniels
(74) *Attorney, Agent, or Firm* — Osha Liang LLP (57) ABSTRACT

The invention relates to a device (1) for sealing an air intake of a motor vehicle, comprising: —at least one sealing means (3) intended to be arranged in an air intake of the motor vehicle, and —a support (5) for the sealing means (3) in order to retain the sealing means (3) and intended to be attached on a load-bearing structure of the motor vehicle. According to the invention, the support (5) comprises damping guidance means (15) for the sealing means (3) in order to allow, in the event of an impact on the sealing means (3), the movement of the sealing means (3) from an initial retaining position to a position retracted with respect to the (Continued)

initial position. The invention also relates to a front-end module for a motor vehicle comprising such a sealing device.

9 Claims, 4 Drawing Sheets

(58) Field of Classification Search
USPC .......................................... 296/187.09, 193.09
See application file for complete search history.

(56) References Cited

U.S. PATENT DOCUMENTS

| 9,216,643 | B2* | 12/2015 | Anderson | ............... | B60K 11/04 |
| 2010/0078149 | A1* | 4/2010 | Yoshimitsu | ............ | B60K 11/04 |
| | | | | | 165/67 |
| 2010/0320020 | A1 | 12/2010 | Hwang | | |

FOREIGN PATENT DOCUMENTS

| DE | 10 2008 051394 A1 | 5/2010 |
| DE | 10 2008 062889 A1 | 7/2010 |
| DE | 10 2013 103377 A1 | 10/2014 |
| DE | 20 2015 100764 U1 | 3/2015 |

OTHER PUBLICATIONS

Written Opinion of the International Searching Authority issued in PCT/EP2016/069927 dated Oct. 19, 2016 (5 pages).

\* cited by examiner

DEVICE FOR SEALING THE AIR INTAKE OF A MOTOR VEHICLE, CORRESPONDING FRONT-END MODULE AND MOTOR VEHICLE

The present invention concerns the holding of an air intake blocking device, usually arranged upstream of a motor vehicle device, such as a heat exchange device, on a load-bearing structure of the vehicle, notably on a front-end module load-bearing structure of the vehicle.

The invention also concerns a corresponding front-end module and a corresponding vehicle.

The front ends of motor vehicles usually comprise an air intake or two air intakes, referred to as upper and lower air intakes, that are separated by a fender. A heat exchange device of the motor vehicle is usually positioned behind this fender and comprises one or more heat exchangers, such as those used to air-condition the passenger compartment, that are designed to be traversed by an air flow entering via the air intake or intakes at the front of the vehicle.

A blocking device including, in a known manner, at least one panel of shutters is also usually assembled in the air intakes of the vehicle. The shutters are for example made of strips assembled pivotingly across the panel. The incline of the shutters can be moved between a vertical closed position blocking the air flow and several intermediate positions as far as a horizontal open position permitting maximum air flow. When the panel of shutters is closed, the vehicle has an improved air drag coefficient, enabling the vehicle to consume less fuel and emit less CO.

Furthermore, the controlled shutters are arranged in front of a heat exchange device, which, when in the closed position, accelerates the temperature increase in the exchangers during the heating phase, also reducing the fuel consumption of the vehicle, and therefore CO emissions.

This blocking device has to be assembled on a load-bearing structure of the motor vehicle, i.e. usually on a structure that is part of the vehicle body, or on a load-bearing structure of the front-end module, ready to be assembled on the vehicle by the manufacturer.

The front fender is designed to absorb low-intensity frontal impacts. However, impacts of slightly higher intensity can damage elements or equipment of the vehicle positioned behind the fender, in particular the front-end module of the motor vehicle, which notably carries the blocking device with these shutters and usually one or more heat exchangers. The panel or panels of shutters, or the heat exchanger or exchangers located behind the shutters, can therefore be damaged by such impacts.

It is therefore desirable to limit the potential damage caused by an accidental impact, notably on the front-end module, which can be costly to repair.

According to a known solution, the air intake blocking device is designed to help absorb the energy of the impact by deforming and/or breaking.

The present invention is intended to improve the solutions in the prior art by proposing a solution in which the blocking device is not deformed in the event of impact under certain conditions, and does not need to be replaced in full.

The invention is intended to overcome the drawbacks in the prior art by proposing an alternative blocking device intended to limit the potential damage caused by an accidental impact, in particular a standard impact known as a Danner impact, which is an impact of the vehicle against a static obstacle at a speed of up to 16 km/h.

For this purpose, the invention relates to an air intake blocking device for a motor vehicle including:

at least one blocking means designed to be arranged in an air intake of the motor vehicle, and
a support for the blocking means that is designed to hold the blocking means and to be attached to a load-bearing structure of the motor vehicle,
characterized in that the support has at least one damping guide means for the blocking means in order to allow, in the event of impact on the blocking means, the blocking means to move from an initial holding position to a withdrawn position behind the initial position, for example in a direction of movement corresponding to a longitudinal direction of said vehicle with the blocking device assembled in said vehicle.

The support is advantageously formed as one or more distinct parts of the blocking means.

According to a preferred embodiment, the blocking means for the air flow includes at least one panel of shutters that is designed to be arranged upstream of a heat exchange device of the motor vehicle in the direction of flow of an air flow.

Thus, in the event of impact on the blocking means such as a panel of shutters, the energy of the impact can be at least partially and preferably gradually absorbed, as a result of the resulting movement of the blocking means.

This prevents damage being caused to the blocking means and to any heat exchangers arranged behind said blocking means.

Said blocking device may also have one or more of the following features, taken separately or in combination.

According to one aspect of the invention, the or each damping guide means are designed to enable a reversible movement of the blocking means in the event of impact. The or said damping guide means are also designed to enable the blocking means to return to the initial holding position after the impact, if no stress is exerted on the blocking device.

According to another aspect of the invention, the or each damping guide means are translational guide means.

Advantageously, the or each damping guide means are designed to define a movement path, for example a slide path, in successive stages, for example in the direction of movement. In other words, the blocking means such as a panel of shutters can perform a jerky movement in the event of impact.

According to yet another aspect of the invention, the or each damping guide means are guide means for guiding an associated retaining element carried by the blocking means from the initial holding position to a withdrawn position, in the event of impact, for example in the direction of movement along a slide path.

In particular, the or each damping guide means can be designed to guide an associated retaining element carried by the blocking means in translation in stages in the event of impact.

The support can have at least one stop to prevent the movement of the retaining element, for example in the movement path of the associated retaining element. The or each stop delimits a corresponding withdrawn position of an associated retaining element in the event of impact.

According to one embodiment, the or each damping guide means includes a slot designed to guide the associated retaining element.

According to one example, the slot defines:
a first opening that is designed to receive the associated retaining element in the initial holding position,
at least one second opening that is designed to receive the associated retaining element in a withdrawn position in the event of impact, and a narrowed portion between two consecutive openings.

The support can be formed so that the contour of the slot has at least one projecting edge oriented towards the inside of the slot, such as to define the narrowed portion between two consecutive openings.

The slot can have a general longitudinal shape, for example substantially oblong, in the direction of movement. Such a longitudinal slot enables translational guidance.

According to one embodiment, the slot is formed with a progressive narrowing in the direction of movement, for example the slot is substantially triangular with the apex of the triangle delimiting an end withdrawn position in the event of impact.

According to another example, the slot defines an insertion opening for the retaining element extended by a channel for moving the retaining element in the direction of movement, and the movement channel is formed by a progressive narrowing of the slot in the direction of movement.

The retaining element can be an attachment stud projecting from the blocking means, for example from the panel of shutters, in a direction perpendicular to the direction of movement.

According to another embodiment, the or each damping guide means include:
- a seat receiving the associated retaining element carried by the blocking means and in which the associated retaining element is moveable, and
- elastic compression means.

The elastic compression means are arranged in the seat and attached firstly to the associated retaining element and secondly in an end region of the seat on the side opposite the blocking means, such that the associated retaining element is able to move in the seat in the event of impact by compression of the elastic compression means.

Advantageously, the elastic compression means enable reversible elastic deformation. According to one example embodiment, said means are return means, such as a compression spring.

According to yet another embodiment, the or each damping guide means include:
- a seat defining an air chamber and receiving the associated retaining element carried by the blocking means, the seat having a first end on the side of the blocking means and a second opposite end, and
- sealing means arranged between the first end of the seat and the associated retaining element carried by the blocking means, such that, in the event of impact, the associated retaining element is able to move in the seat towards the second end of the seat by compressing the air in the air chamber.

Advantageously, the or each damping guide means comprise means for returning the associated retaining element to the initial holding position in the seat.

According to yet another embodiment, the or each damping guide means include at least one wall having a plurality of notches defining different withdrawn positions behind the initial holding position in the event of impact, being designed to cooperate with a matching counter-shape of the associated retaining element carried by the blocking device.

For example, the or each damping guide means comprise a rack designed to cooperate with a matching notched counter-shape of the associated retaining element carried by the blocking device.

In a variant, the damping guide means comprise a plurality of indentations or orifices designed to receive a plurality of projections of matching shape provided on the associated retaining element carried by the blocking device.

According to another variant, the wall has a plurality of projections that are designed to be inserted in a plurality of indentations or orifices of matching shape on the associated retaining element carried by the blocking device.

According to one aspect of the invention, the retaining element is an attachment lug extending at least partially in the direction of movement.

According to another aspect of the invention, the blocking device has several attachment zones, preferably at least four attachment zones, between the blocking means and the support for the blocking means, and the support has, at each attachment zone, one damping guide means for the blocking means in order to allow, in the event of impact on the blocking means, the blocking means to move from an initial holding position to a withdrawn position behind the initial position.

The invention also relates to a front-end module for a motor vehicle comprising a blocking device as defined above, the blocking device comprising:
- at least one panel of shutters arranged upstream of a heat exchange device in the direction of flow of an air flow, and
- a support for the panel of shutters that holds the panel of shutters and that is attached to a load-bearing structure of the front-end module, the support having at least one damping guide means for the panel of shutters to enable the panel of shutters to move from the initial holding position to a withdrawn position in the event of impact on said vehicle.

The invention also concerns a motor vehicle comprising a blocking device as defined above, comprising:
- at least one panel of shutters arranged upstream of a heat exchange device in the direction of flow of an air flow, and
- a support for the panel of shutters that holds the panel of shutters and that is attached to a load-bearing structure of said vehicle, the support having at least one damping guide means for the panel of shutters to enable the panel of shutters to move from the initial holding position to a withdrawn position in the event of impact on said vehicle.

Other characteristics and advantages of the invention will become more clearly apparent on reading the description below, given by way of non-limiting example and the attached drawings, in which.

In these figures, substantially identical elements bear the same reference signs.

The elements in FIGS. 7 to 9b and the elements in FIGS. 10 to 13 that correspond to the elements in FIGS. 1 to 6 are indicated using the same reference signs plus 100 or 200, respectively.

The following embodiments are examples. Although the description refers to one or more embodiments, this does not necessarily mean that each reference refers to the same embodiment, or that the characteristics apply only to one embodiment. Individual characteristics of different embodiments may also be combined to provide other embodiments.

The invention concerns a blocking device 1, 101, 201 for one or more air intakes of a motor vehicle.

In a known manner, a motor vehicle has one or more air intakes arranged on the front of the vehicle. The motor vehicle also has a heat exchange device comprising one or more heat exchangers, such as a condenser and/or a radiator.

The blocking device 1, 101, 201 is designed to be arranged upstream of the heat exchange device in the direction of flow of an air flow entering via the air intake or air intakes of the motor vehicle. When assembled on the motor vehicle, the blocking device 1, 101, 201 is arranged in front of the heat exchange device along the longitudinal axis of the motor vehicle.

In the present description, the terms "front" and "rear" relate to the direction of movement of the motor vehicle, and the terms "vertical", "horizontal", "upper", "lower", "top" and "bottom" relate to the arrangement of the elements in the figures, which is the same as the arrangement of the elements in the assembled motor vehicle.

FIRST EMBODIMENT

Figures 1, 2, 3, 4:
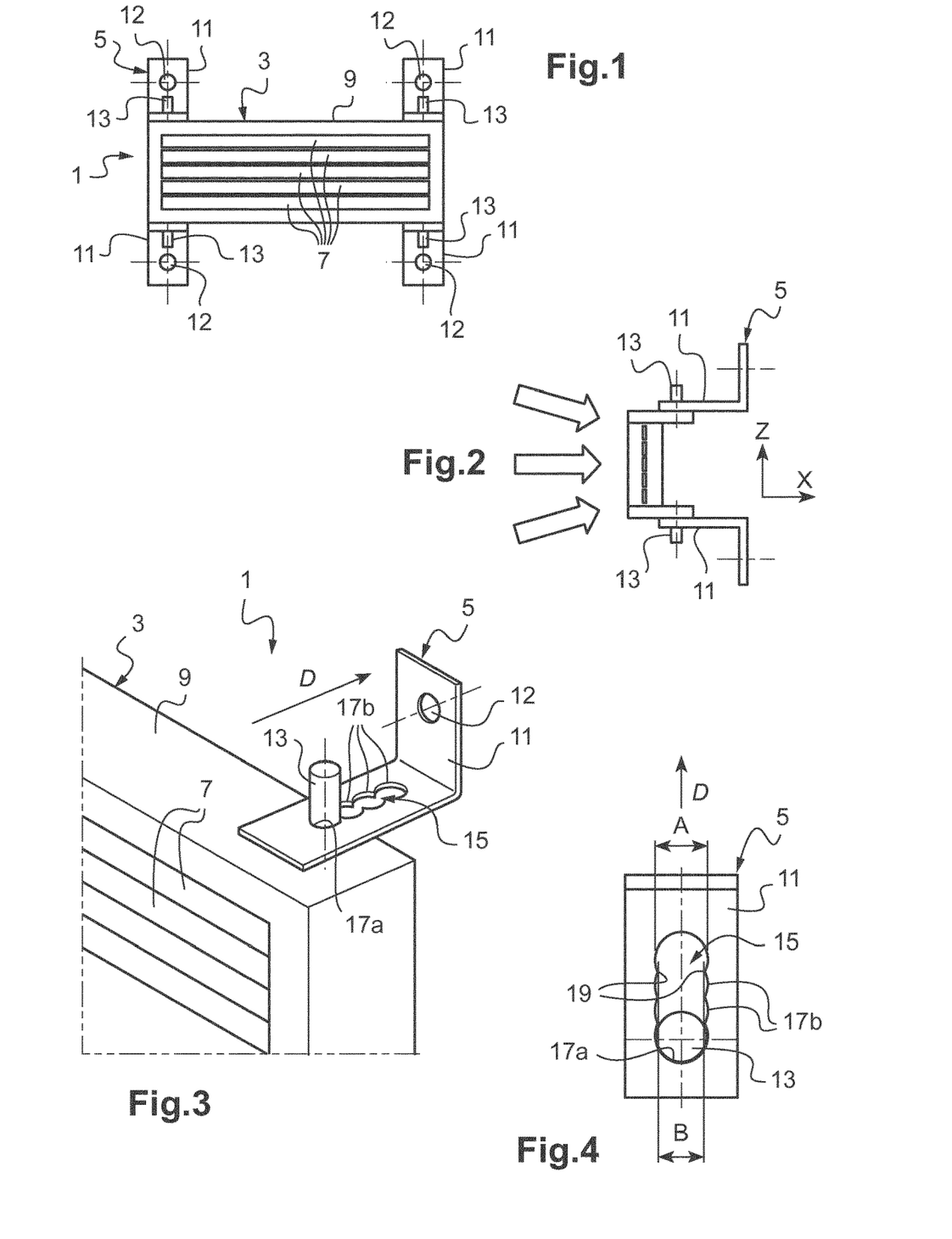
FIG. 1 is a schematic front view of a blocking device according to a first embodiment.
FIG. 2 is a side view of the blocking device in FIG. 1 according to the first embodiment.
FIG. 3 is a perspective view of an example embodiment of damping guide means for a support for the blocking device in FIG. 1 or 2.
FIG. 4 is a top view of the damping guide means according to the example in FIG. 3.

FIGS. 1 and 2 are perspective views of a blocking device 1 according to a first embodiment. The axis X shown in FIG. 2 is the longitudinal axis of the motor vehicle and the axis Z is the vertical axis along the height of the motor vehicle.

The blocking device 1 includes at least one blocking means 3 designed to be arranged in the air intake of the motor vehicle and a support 5 for said blocking means 3.

Advantageously, the blocking means include a panel 3 of shutters 7.

In particular where the vehicle 1 has several air intakes, the blocking device 1, 101, 201 can have several panels of shutters designed to be arranged in a respective air intake. The panels 3 of shutters 7 can be independent of one another.

The or each panel 3 of shutters 7 includes a plurality of shutters 7. The panel 3 for example has a frame 9 on which at least one set of shutters 7 is installed. In the example illustrated, the frame 9 is overall substantially parallelepipedic. The shutters 7 can be superposed within this frame 9, for example along the vertical axis Z in this case, and arranged parallel with one another. The shutters 7 can be moveable between a position blocking one or more air intakes, for example a vertical blocking position, in which the shutters 7 are closed, thereby preventing the air from passing through, and several intermediate positions up to an optimum open position, for example a horizontal position enabling the air to pass through the blocking device at the greatest possible flow rate. The shutters 7 are advantageously assembled pivotingly about parallel pivot axes extending for example in the width wise direction of the motor vehicle.

The present document describes a panel 3 of shutters 7 acting as blocking means, although the invention shall also apply to any other means for blocking the air intake of a motor vehicle, that is notably designed to be arranged on the front end of the vehicle in front of a heat exchange device.

The support 5 is designed to hold the panel 3 of shutters 7. The support 5 is advantageously a part separate from the panel 3 of shutters 7.

In the example illustrated, the blocking device 1 has several attachment zones, preferably at least four attachment zones, between the blocking means 3 and the support 5. In this case, the attachment zones are provided on either sides of the panel 3 of shutters 7 along the vertical axis Z, therefore at the top and bottom of the panel 3 of shutters 7, but also on each side of the panel 3 of shutters 7, therefore to the left and right with reference to the arrangement illustrated in FIG. 1.

According to the example illustrated in FIGS. 1 and 3, the support 5 has attachment means 11 in each attachment zone, for example in the form of attachment tabs 11. In this case, the panel 3 of shutters 7 has a retaining element 13 in each attachment zone, in this case the panel 3 of shutters 7 has four retaining elements 13 designed to cooperate with associated attachment means 11 of the support 5.

The support 5 therefore holds a portion of the blocking means 3 and is designed to be attached elsewhere to a load-bearing structure (not shown) of the motor vehicle or of a front-end module of the motor vehicle.

To do so, each attachment tab 11 of the support 5 is, in the example shown, made in two portions, with one portion designed to be attached to the load-bearing structure (not shown) and another portion being designed to hold the panel 3 of shutters 7. With reference to FIGS. 2 and 3, each attachment tab 11 is substantially L-shaped. The portion designed to be attached to the load-bearing structure may have one or more holes 12 to provide a rigid attachment to the load-bearing structure (not shown). "Rigid attachment" means that the attachment tabs 11 are arranged statically in relation to this load-bearing structure (not shown), notably without any flexibility of movement of the attachment tabs 11 in relation to the load-bearing structure (not shown).

The support 5 is also designed to enable the movement of the blocking means, in this case of the panel 3 of shutters 7, from an initial holding position to a withdrawn position behind the initial position, in a direction of movement D in the event of impact (shown schematically by the arrows in FIG. 2) on the motor vehicle and therefore an impact on the panel 3 of shutters 7. When the blocking device 1 is assembled in the motor vehicle, the panel 3 of shutters 7 can move along the longitudinal axis X of the motor vehicle in the event of impact.

The materials and the dimensions of the frame 9 and of the retaining elements 13 of the panel 3 of shutters 7 on one hand and the support 5 on the other are selected to enable a stress caused by an impact on the panel 3 of shutters 7 causing the movement of the panel 3 of shutters 7 to be absorbed without breaking this panel 3 of shutters 7. By way of non-limiting example, the frame 9 and the retaining elements 13 can be made of polypropylene with glass fibers, and the support 5, notably each attachment tab 11 of the support 5, can be made of metal.

More specifically, the support 5 is designed to enable the panel 3 of shutters 7 to move, in the event of impact, from the initial holding position to a withdrawn position behind the initial position, in each attachment zone.

To do so, the support 3 includes, advantageously at each attachment tab 11, damping guide means 15, 15' for guiding the panel 3 of shutters 7 from the initial holding position to a withdrawn position, in the event of impact, in the direction of movement D. The guidance may be translational guidance.

More specifically, each damping guide means 15, 15' can guide a respective associated retaining element 13 carried by the panel 3 of shutters 7.

According to the first embodiment illustrated in FIGS. 1 to 6, each attachment tab 11 has translational guide means 15, 15' for an associated retaining element 13 carried by the panel 3 of shutters 7.

The guide means are in this case a slot 15, 15' in each attachment tab 11. More specifically, the slot 15, 15' is formed in a portion of the attachment tab 11 bearing at least partially against the frame 9 of the panel 3 of shutters 7.

The inside of the slot 15, 15' defines a movement path, in this case a sliding movement path, for the associated retaining element 13.

The retaining element 13 can in turn be an attachment rod or stud projecting from the frame 9 of the panel 3 of shutters 7, in this case in a direction substantially perpendicular to the direction of movement D along the vertical axis Z. According to the specific example illustrated in FIGS. 1 to 6, the panel 3 of shutters 7 has four attachment studs 13 projecting from the frame 9 and inserted respectively in an associated slot 15, 15' of a corresponding attachment tab 11 of the support 5.

The remainder of the description of the first embodiment refers to an attachment stud as a retaining element 13. Naturally, other variants are possible.

Each attachment stud 13 can move in an associated slot 15, 15' from an initial holding position to one or more withdrawn positions behind the initial holding position in the direction of movement D. The panel 3 of shutters is in an initial holding position when each attachment stud 13 is in the initial holding position in the associated slot 15, 15', and it is the movement of the attachment studs 13 towards a withdrawn position that enables the panel 3 of shutters 7 to move towards the withdrawn position.

Furthermore, the slot 15, 15' can have a general longitudinal shape extending in the direction of movement D.

In the example shown in FIGS. 3 and 4, the general shape of the slot 15 is substantially oblong in the direction of movement D.

In order to define several movement stages, in this case sliding movement stages, that can generate a jerky movement or movement in stages of the attachment stud 13 in the event of impact, at least one stop preventing the movement of this attachment stud 13 can be provided in the slide path defined by the slot 15. The blocking device is thus designed to remain in a static position defined by one of these stages.

In the variant shown in FIGS. 3 and 4, the slot 15 defines:

a first opening 17a that is designed to receive the attachment stud 13 in the initial holding position, at least one second opening 17b that is designed to receive the attachment stud 13 in a withdrawn position in the event of impact.

In the example shown, the slot 15 defines four successive openings 17a, 17b: a first opening 17a and three subsequent openings 17b.

In order to distinguish two consecutive openings, the slot 15 has a narrowed portion between these two consecutive openings. To do so, the contour of the slot 15 has at least one projecting edge 19 oriented towards the inside of the slot 15.

The projecting edge or edges 19 define a narrowed portion between two consecutive openings. In the example illustrated, the contour of the slot 15 has two opposing projecting edges 19 between two consecutive openings. As shown schematically in FIG. 4, the dimension A, in this case the width, of the slot 15 at an opening 17a or 17b is greater than the dimension B, in this case the width, at the projecting edges 19. Dimension A is designed to enable insertion of the attachment stud 13.

According to the embodiment illustrated in FIGS. 3 and 4, the pairs of opposing projecting edges 19 form a stop preventing the movement of the attachment stud 13 in the slide path. Each pair of opposing projecting edges 19 delimits a corresponding withdrawn position of the attachment stud 13 in the event of impact. Thus, in this example, the slot 15 has four openings 17a, 17b, the openings 17a, 17b being separated in pairs by the projecting edges 19 projecting towards the inside of the slot 15, which distinguish the four openings that then form four possible positions for the associated attachment stud 13.

The slot 15 thus defines a slide path for the attachment stud 13 in successive stages in the direction of movement D. Indeed, in the event of a frontal impact on the motor vehicle causing an impact on the panel 3 of shutters 7, each attachment stud 13 is guided backwards in an associated slot 15 from an opening 17a, 17b towards the next opening, forcing same through the narrowed portion of dimension B.

The attachment tabs 11 of the support 5 are then deformed around the projecting edges 19. In the event of deformation or damage, each attachment tab 11 can be easily removed and replaced, without having to repair or change the panel 3 of shutters 7. The attachment tabs 11 of the support 5 thus act as "mechanical fuses" that are deformed in the event of impact, preventing excessive mechanical force from being transmitted to the load-bearing structure of the vehicle (not shown) and notably to the heat exchange device usually arranged behind the panel 3 of shutters 7 in the vehicle.

Depending on the intensity of the impact, the attachment stud 13 can move from the first opening 17a to the second opening 17b or a subsequent opening 17b with a jerky movement or movement in stages along the slot 15.

Thus, in the event of impact, this design of the slots 15 of the attachment tabs 11 of the support 5 enables absorption of the impact by moving all of the attachment studs 13 and therefore the panel 3 of shutters 7 backwards in the direction of movement D. Furthermore, following a low-speed impact, the panel 3 of shutters 7 remains held by the support 5, but this time the attachment studs 13 are in an opening 17b of the associated attachment tab 11 other than the opening 17a for holding same in the initial position.

Figures 5, 6, 7, 10:
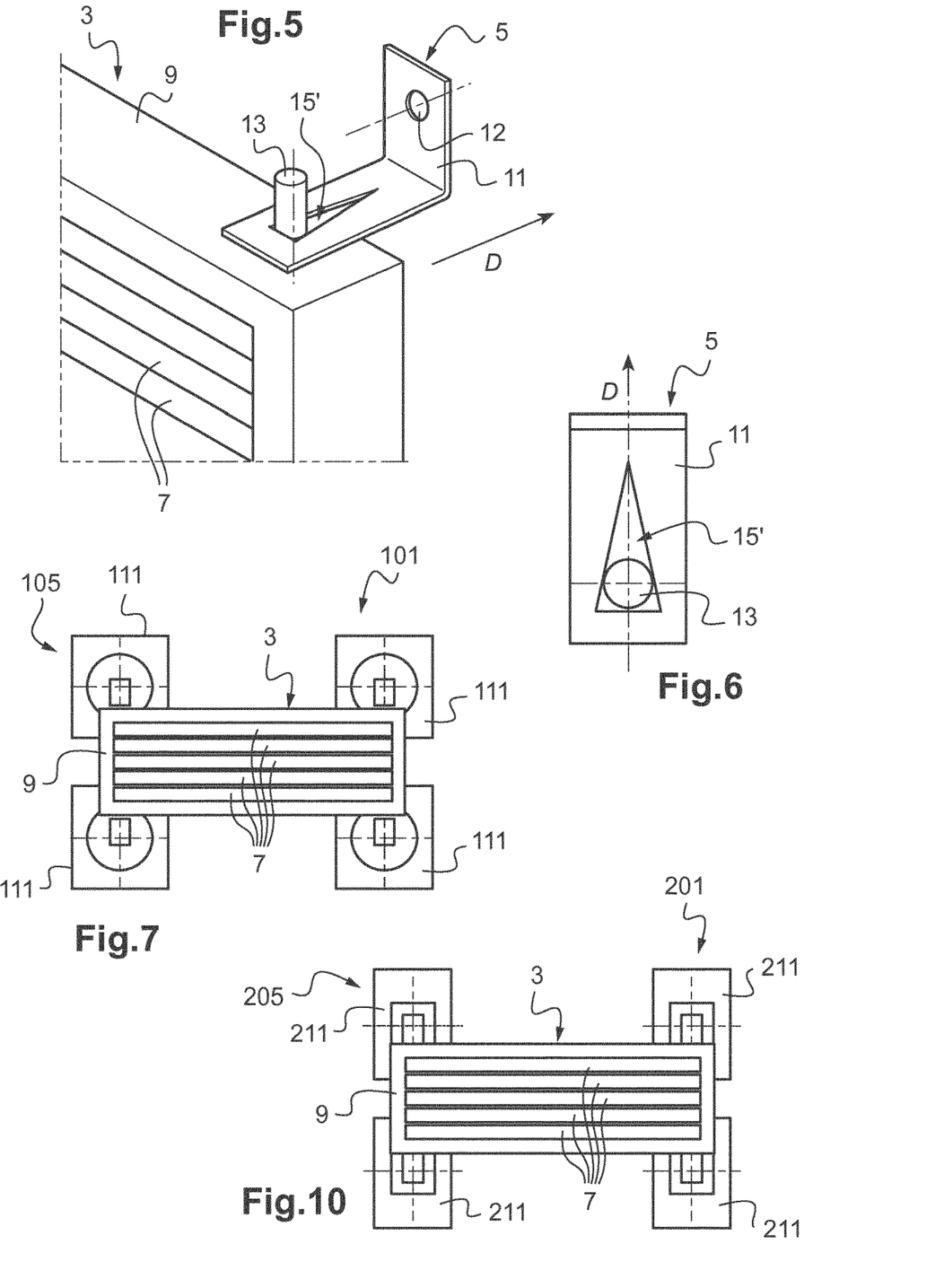
FIG. 5 is a perspective view of another example embodiment of damping guide means for a support for the blocking device in FIG. 1 or 2.
FIG. 6 is a top view of the damping guide means according to the example in FIG. 5.
FIG. 7 is a schematic front view of a blocking device according to a second embodiment.
FIG. 10 is a schematic front view of a blocking device according to a third embodiment.

According to another variant illustrated in FIGS. 5 and 6, the slot 15' is formed with a progressive narrowing in the direction of movement D. The clearance area for the attachment stud 13 thus becomes smaller in the direction of movement D, making it increasingly difficult to move the attachment stud 13 in the slot 15' as the attachment stud 13 approaches the end of the slot 15' opposite the panel 3 of shutters 7. In this example, the slot 15' is substantially triangular with the apex of the triangle arranged on the opposite side of the panel 3 of shutters 7, delimiting a withdrawn end-of-travel position for the attachment stud 13 in the event of impact.

Thus, the slot 15' defines an insertion opening for the associated attachment stud 13, for example at the base of the triangle in this case, and this insertion opening is extended by a channel for moving the attachment stud 13 that narrows progressively in the direction of movement D. This design ensures that the stress exerted by the contour of the slot 15' increases as the attachment stud 13 moves backwards in the direction of movement D.

Again in this case, the slot 15' thus defines a slide path for the attachment stud 13 in successive stages in the direction of movement D. Indeed, in the event of a frontal impact on the motor vehicle causing an impact on the panel 3 of shutters 7, each attachment stud 13 is guided backwards in an associated slot 15', forcing same through the increasingly narrow channel. Depending on the intensity of the impact, the attachment stud 13 can move progressively from an intermediate position in the slot 15' or to the end, in this case the apex of the triangle. The contour of the slot 15' is then deformed by the forced movement of the attachment stud 13.

As before, in the event of impact, this design of the slots 15' of the attachment tabs 11 of the support 5 with a progressive narrowing enables absorption of the impact by moving all of the attachment studs 13 and therefore the panel 3 of shutters 7 backwards in the direction of movement D.

SECOND EMBODIMENT

FIG. 7 shows a blocking device 101 according to a second embodiment. Only the differences from the first embodiment described with reference to FIGS. 1 to 6 are detailed below. Identical elements are not described again.

Figure 8A:
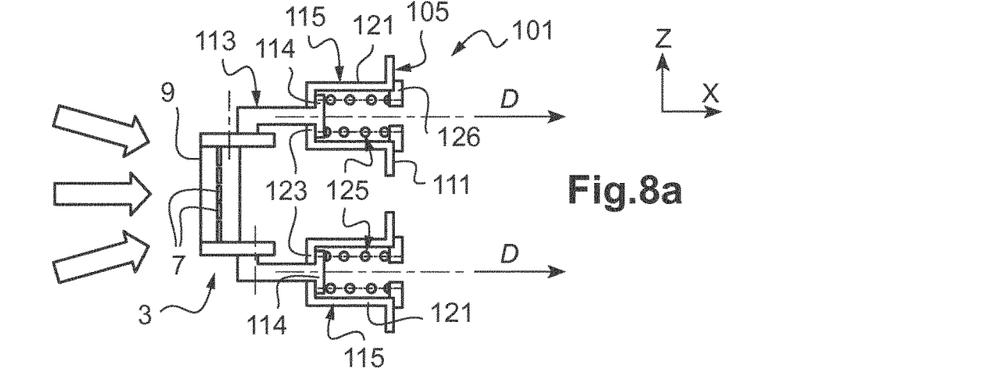
FIG. 8a is a side view of the blocking device in FIG. 7 according to the second embodiment before impact.
Figure 8B:
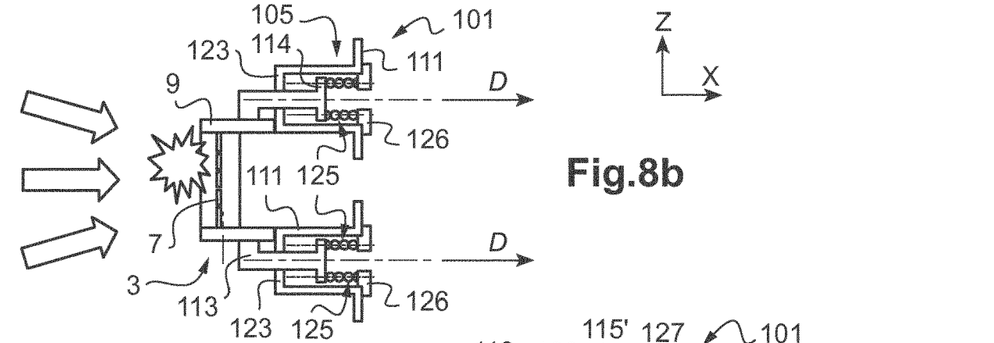
FIG. 8b is a side view of the blocking device in FIG. 7 according to the second embodiment after impact.
Figure 9A:
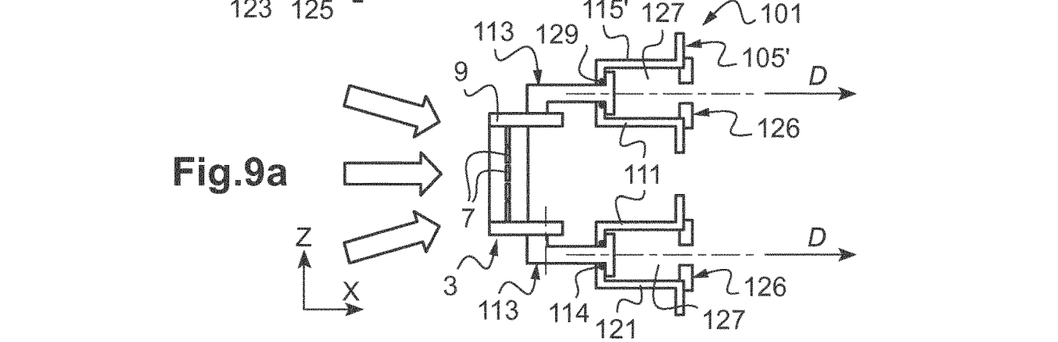
FIG. 9a is a side view of the blocking device in FIG. 7 comprising a support according to a variant embodiment before impact.
Figure 9B:
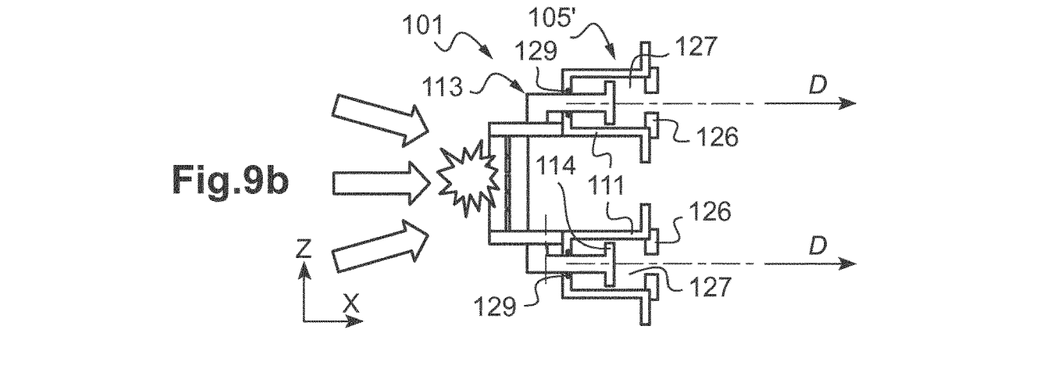
FIG. 9b is a side view of the blocking device in FIG. 9a after impact.

As shown more clearly in FIGS. 8a to 9b, according to this second embodiment, the support 105, 105' of the panel 3 of shutters 7 can have attachment means 111 in each attachment zone, said attachment means being an attachment receptacle or sleeve 111. The support 205 includes damping guide means 115, 115', in this case near to each attachment sleeve 111, said damping guide means comprising a seat 121 or receptacle, for example having an overall substantially cylindrical shape, for receiving an associated retaining element 113 carried by the panel 3 of shutters 7, the latter being guidable in the seat 121 from the initial holding position shown in FIGS. 8a and 9a to a withdrawn position, as illustrated in FIGS. 8b and 9b.

In this example, the rear portion of the seat 121 opposite the panel 3 of shutters 7 is in this case designed for attachment to a load-bearing structure (not shown).

This second embodiment may include a retaining element in the form of an attachment lug 113. In this case, the panel 3 of shutters 7 has four attachment lugs 113 that extend from the frame 9. Each attachment lug 113 extends at least partially, principally in this example, in the direction of movement D. The attachment lugs 113 can be connected respectively by an elbow portion of the frame 9 of the panel 3 of shutters.

Furthermore, each attachment lug 113 has a stop 114 at the free longitudinal end thereof, in this case the rear longitudinal and opposite the frame 9, said stop 114 being arranged inside the seat 121 and bearing against at least one supplementary wall 123 of the seat 121 in the initial holding position, as illustrated in FIGS. 8a and 9a.

In the specific example illustrated in FIGS. 8a to 9b, the seat 121 has a wall 123 at the front end thereof, on the side of the panel 3 of shutters 7, said wall being substantially annular and against which the stop 114 terminating an attachment lug 113 bears in the initial holding position. The wall 123 therefore forms a front wall. The diameter of the opening of the annular wall 123 is less than the body of the substantially cylindrical seat 121 inside which the attachment lug 113 can move. Furthermore, the stop 114 at the end of the attachment lug 113 is larger than the diameter of this opening in the annular wall 123 such that the stop 114 cannot come out of the seat 121. However, the diameter of this opening in the annular wall 123 is large enough to enable the rest of the attachment lug 113 to come out of the stop 114.

With reference to FIGS. 8b and 9b, in the event of impact, each attachment lug 113 is moved inside the seat 121 by means of a translational movement in the direction of movement D, moving the stop 114 away from the front wall 123 of the seat 121.

Stops can also be provided to prevent the movement of the attachment lugs 113 to define one or more withdrawn positions. In this example, the frame 9 can butt against the wall 123, on the outside of the seat 121 at the end-of-travel position of the panel 3 of shutters 7.

Advantageously, the movement of the attachment lugs 113, and therefore of the panel 3 of shutters 7, is reversible. In other words, the support 105, 105', and in particular each damping guide means 115, 115', is designed to also enable the panel 3 of shutters 7 to return to the initial holding position following an impact causing the panel 3 of shutters 7 to move to a withdrawn position, once there is no longer any stress being exerted on the panel 3 of shutters 7 along the axis of the impact.

According to a variant illustrated in FIGS. 8a and 8b, the or each guide means 115 include elastic compression means 125 firstly arranged and attached in the seat 121 and secondly attached to a respective retaining element 113, in this case the stop 114 at the end of an attachment lug 113. Thus, in the event of impact, the attachment lug 113 is able to move in the seat 121 by compression of the elastic compression means 125 (see FIG. 8b). More specifically, the elastic compression means 125 are attached in a rear end region of the seat 121 on the side opposite the panel 3 of shutters 7, for example and without limitation to a cup 126 arranged to the rear and rigidly connected to the seat 121. This cup 126 is for example substantially annular.

The elastic compression means 125 therefore enable elastic deformation and are advantageously designed to enable reversible deformation. Said means are for example return means, such as a compression spring 125. The compression spring 125 is therefore provided to absorb the impact within the range of the spring 125.

After the impact and once there is no longer any stress being exerted on the panel 3 of shutters 7 along the axis of the impact, the attachment lug 113 can be brought to the initial holding position in FIG. 8a under the effect of the compression spring 125.

According to another variant illustrated in FIGS. 9a and 9b, the support 105' is not designed for a movement of the attachment lugs 113 against a respective compression means, but in this case the inside of the seat 121 defines an air chamber 127, and the movement of each attachment lug 113 is possible by compression of the air inside the associated air chamber 127.

For this purpose, an air seal is provided at the front of the seat 121 on the side of the panel 3 of shutters 7, while air must be allowed to escape from the rear of the seat 121, on the side opposite the panel 3 of shutters 7.

To do so, sealing means 129 are arranged between the end of the seat 121 on the side of the panel 3 of shutters 7, i.e. the front end of the seat 121, and the attachment lug 113. In this example, the sealing means 129 are arranged in the opening of the annular wall 123 at the front of the seat 121.

On the other hand, the rear of the seat 121 can have an air output orifice with a diameter less than the diameter defined by the body of the seat 121. The air output orifice is for example defined by the opening of the cup 126 arranged to the rear of the seat 121.

In order to enable a reversible movement, and therefore a return to the initial holding position once the stress along the axis of the impact has disappeared, returns means are advantageously provided for each attachment lug 113 to return same to the initial holding position in the corresponding seat 121 defining an air chamber 127. These return means, such as a spring (not shown), are attached at one end to the attachment lug 113, for example close to the stop 114, and can also be attached at the other end either to the front or to the rear of the seat 121.

THIRD EMBODIMENT

Figure 11A:
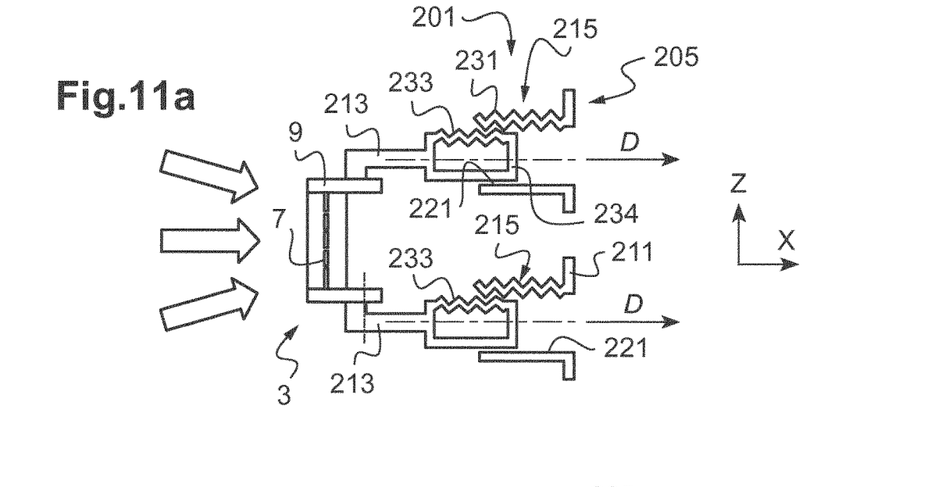
FIG. 11a is a side view of the blocking device in FIG. 10 according to the third embodiment before impact.
Figure 11B:
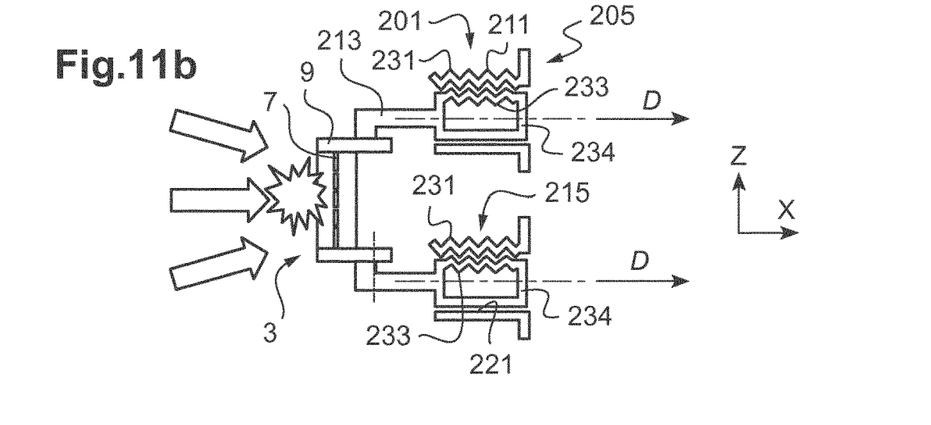
FIG. 11b is a side view of the blocking device in FIG. 10 according to the third embodiment after impact.

FIGS. 10 to 11b show a blocking device 201 according to a third embodiment. Only the differences from the second embodiment described with reference to FIGS. 7 to 9b are detailed below. Identical elements are not described again.

According to this third embodiment, the or each damping guide means 205 or 205' (FIGS. 11a to 13) include at least one wall that has a plurality of notches and that is designed to cooperate with a matching counter-shape of the retaining element 213 carried by the panel 3 of shutters 7. These notches make it possible to define different withdrawn positions (FIG. 11b) behind the initial holding position (FIG. 11a) in the event of impact on the panel 3 of shutters 7, enabling the retaining element 213 to move jerkily or in stages in the event of impact. The shape and size of these notches are variable as a function of the design and of the elasticity of the material used.

Figures 12, 13:
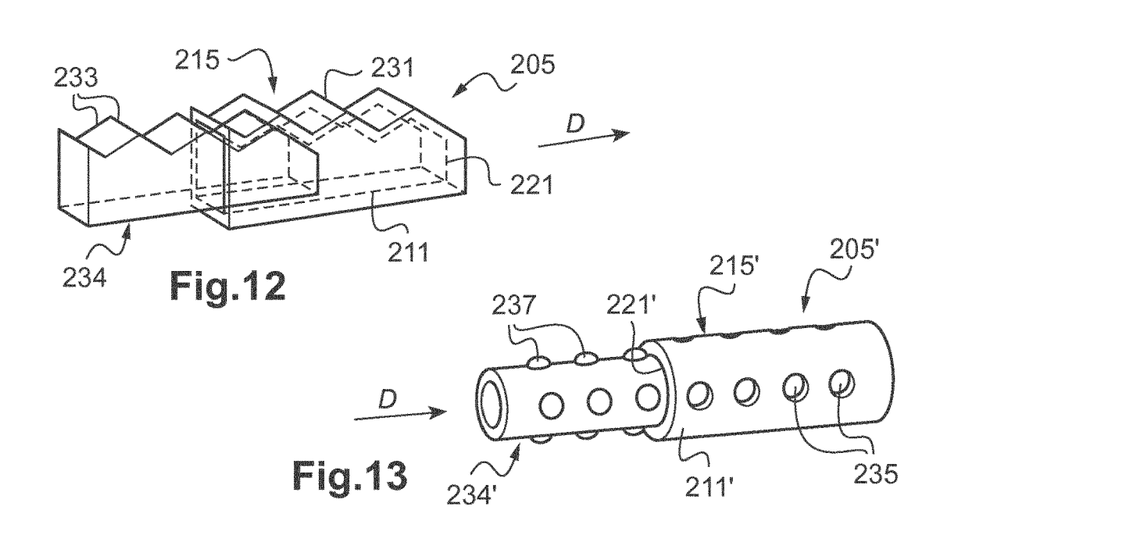
FIG. 12 is a schematic view of an example embodiment with positive engagement between the support and the blocking means of the blocking device in FIGS. 10 to 11b.
FIG. 13 is a schematic view of a variant embodiment of FIG. 12 showing another form of positive engagement between the support and the blocking means.

In the example in FIGS. 11a to 12, the attachment sleeve 211 has at least one rack 231 forming guide means 205. The rack 231 is designed to cooperate with a notched matching counter-shape 233 provided on the retaining element 213. The notched counter-shape 233 is for example provided on a wall of a pin 234 terminating the attachment lug 213, this pin 234 being inserted and moved inside the seat 221 defined by the attachment sleeve 211. In this example, the rack 231 is provided on the upper wall of the sleeve 211 defining the seat 221. Complementarily, the upper wall of the pin 234 of the attachment lug 213 has the notched counter-shape 233.

According to a variant illustrated in FIG. 13, the attachment sleeve 211' defining the seat 221' has a plurality of indentations or orifices 235 designed to receive a plurality of projections 237 shaped to match the shape of the indentations or orifices 235 provided in a respective pin 234' terminating the associated attachment lug 213. Conversely, the indentations or orifices can be provided in the pin 234' of the attachment lug 213 and the matching projections on the support 205.

The positive engagement between the rack 231 and the notched counter-shape 233 or between the indentations/orifices 235 and the projections 237 make it possible to define a succession of hard points that enable the movement of the pins 234, 234' in the corresponding seats 221, 221' while gradually absorbing the energy.

Thus, during an impact on the panel 3 of shutters 7, the panel 3 is pushed backwards, the pins 234 or 234' enter the corresponding seats 221 or 221' and move backwards in the direction D. The movement of each notch caused by the positive engagement between the pins 234, 234' and the corresponding sleeves 211, 211' help to dissipate some of the energy of the impact on each occasion.

Furthermore, the pins 234, 234' can be independent of the remainder of the attachment lug 213 and more generally of the panel 3 of shutters 7, i.e. said pins are modular and removable such as to be easy to replace in the event of damage following an impact.

Thus, the blocking device 1; 101; 201 with a support 5; 105, 105'; 205, 205' of the panel 3 of shutters 7 according to one or other of the embodiments described above makes it possible, in the event of low-speed impact, in particular in the event of a standardized Danner impact, for the panel 3 of shutters 7 to be guided backwards along the axis of the impact while absorbing the energy of the impact, in other words damping the impact. This prevents damage being caused to the panel 3 of shutters 7 itself, and also protects the heat exchanger or exchangers usually positioned behind the panel 3 of shutters 7.

The invention claimed is:

1. An air-intake blocking device for a motor vehicle comprising:
    at least one blocking means arranged in an air intake of the motor vehicle; and
    a support for the blocking means that holds the blocking means and is configured to be attached to a load-bearing structure of the motor vehicle,
    wherein the support has at least one damping guide means for the blocking means in order to allow, in the event of impact on the blocking means, the blocking means to move from an initial holding position to a withdrawn position behind the initial position,
    wherein said at least one damping guide means is for guiding an associated retaining element carried by the blocking means from the initial holding position to the withdrawn position, in the event of impact,
    wherein said at least one damping guide means includes a slot to guide the associated retaining element, and
    wherein the slot is formed with a progressive narrowing.

2. The blocking device as claimed in claim 1, wherein the blocking means for the air flow includes at least one panel of shutters that is arranged upstream of a heat exchange device of the motor vehicle in the direction of flow of an air flow.

3. The blocking device as claimed in claim 1, wherein said at least one damping guide means is configured to enable a reversible movement of the blocking means in the event of impact.

4. The blocking device as claimed in claim 1, wherein said at least one damping guide means is a translational guide means.

5. The blocking device as claimed in claim 1, wherein said at least one damping guide means forms a movement path in successive stages.

6. The blocking device as claimed in claim 1, wherein the support has at least one stop preventing the movement of the associated retaining element, said at least one stop delimiting a corresponding withdrawn position of the associated retaining element in the event of impact.

7. A front-end module for a motor vehicle including the blocking device of claim 1.

8. An air-intake blocking device for a motor vehicle comprising:
- at least one blocking means arranged in an air intake of the motor vehicle; and
- a support for the blocking means that holds the blocking means and is configured to be attached to a load-bearing structure of the motor vehicle,
- wherein the support has at least one damping guide means for the blocking means in order to allow, in the event of impact on the blocking means, the blocking means to move from an initial holding position to a withdrawn position behind the initial position,
- wherein said at least one damping guide means is for guiding an associated retaining element carried by the blocking means from the initial holding position to the withdrawn position, in the event of impact,
- wherein said at least one damping guide means include:
  - a seat defining an air chamber and receiving the associated retaining element carried by the blocking means, the seat having a first end on the side of the blocking means and a second opposite end, and
  - sealing means arranged between the first end of the seat and the associated retaining element carried by the blocking means, such that, in the event of impact, the associated retaining element is able to move in the seat towards the second end of the seat by compressing the air in the air chamber.

9. An air-intake blocking device for a motor vehicle comprising:
- at least one blocking means arranged in an air intake of the motor vehicle; and
- a support for the blocking means that holds the blocking means and is configured to be attached to a load-bearing structure of the motor vehicle,
- wherein the support has at least one damping guide means for the blocking means in order to allow, in the event of impact on the blocking means, the blocking means to move from an initial holding position to a withdrawn position behind the initial position,
- wherein said at least one damping guide means includes a slot to guide an associated retaining element carried by the blocking means, and
- wherein the slot is formed with a progressive narrowing.

* * * * *